US010160310B2

(12) United States Patent
Solazzo et al.

(10) Patent No.: US 10,160,310 B2
(45) Date of Patent: Dec. 25, 2018

(54) AIR FLAP DEVICE HAVING A PLURALITY OF AIR FLAPS WITH AIR FLAP MOVEMENT ENDING SEQUENTIALLY

(71) Applicant: Röchling Automotive SE & Co. KG, Mannheim (DE)

(72) Inventors: Domenico Solazzo, Worms (DE); Anton Pfeifer, Leifers (IT)

(73) Assignee: Röchling Automotive SE & Co. KG, Mannheim (DE)

( * ) Notice: Subject to any disclaimer, the term of this patent is extended or adjusted under 35 U.S.C. 154(b) by 0 days.

(21) Appl. No.: 15/838,298

(22) Filed: Dec. 11, 2017

(65) Prior Publication Data

US 2018/0170171 A1 Jun. 21, 2018

(30) Foreign Application Priority Data

Dec. 15, 2016 (DE) .......................... 10 2016 225 112

(51) Int. Cl.
*B60K 11/06* (2006.01)
*B60K 11/08* (2006.01)
(Continued)

(52) U.S. Cl.
CPC ............ *B60K 11/085* (2013.01); *B60K 11/06* (2013.01); *F01P 7/026* (2013.01); *F01P 7/12* (2013.01)

(58) Field of Classification Search
CPC ............................. B60K 11/08; B60K 11/085
(Continued)

(56) References Cited

U.S. PATENT DOCUMENTS 2,901,961 A * 9/1959 Cotts ..................... F24F 13/075
454/284
5,141,026 A * 8/1992 Collette ............... B60K 11/085
137/601.09
(Continued)

FOREIGN PATENT DOCUMENTS

DE 602004007338 T2 3/2008
DE 102013213136 A1 1/2015
WO 2017021205 A2 2/2017

OTHER PUBLICATIONS

German Search Report for corresponding DE 10 2016 225 112.0 dated Sep. 21, 2017, 9 pgs.
(Continued)

*Primary Examiner* — Jeffrey J Restifo
(74) *Attorney, Agent, or Firm* — Rankin, Hill & Clark LLP

(57) ABSTRACT

An air flap device for a motor vehicle, having an air flap member with a flow-through opening and having a plurality of air flaps, which protrude into the flow-through opening or pass through it and which are each mounted on the air flap member so that they can move between a blocking position as a working position and a feed-through position as another working position, wherein each air flap in its blocking position interferes with flow through the flow-through opening as intended to a greater extent than in the feed-through position, wherein the air flap device has, as one operating position, a closed position, in which each air flap of the plurality of air flaps is in the blocking position as the working position associated with the closed position, and has an open position as another operating position, in which each air flap of the plurality of air flaps is in the feed-through position as the working position associated with the open position, the air flap device having a drive device for supplying a driving force for the movement of the air flaps (Continued)

between the blocking position and the feed-through position and a coupling device for transfer of the driving force supplied by the drive device to the air flaps, the coupling device is coupled to the plurality of air flaps such that at least some of the air flaps, because of an adjustment operation of the air flap device into a target operating position, reach their target working positions associated with the target operating position at different points in time.

9 Claims, 1 Drawing Sheet

(51) Int. Cl.
*F01P 7/02* (2006.01)
*F01P 7/12* (2006.01)

(58) Field of Classification Search
USPC .............................. 180/68.1, 68.2, 68.3, 68.4
See application file for complete search history.

(56) References Cited

U.S. PATENT DOCUMENTS

| | | | | |
|---|---|---|---|---|
| 5,732,666 A * | 3/1998 | Lee | ...................... | B60K 11/085 123/41.05 |
| 5,769,709 A * | 6/1998 | Kim | ...................... | F24F 13/075 454/233 |
| 6,854,544 B2 * | 2/2005 | Vide | ...................... | B60K 11/085 180/68.1 |
| 8,181,727 B2 * | 5/2012 | Ritz | ...................... | B60K 11/085 180/68.1 |
| 8,292,014 B2 * | 10/2012 | Sugiyama | ............. | B60K 11/085 123/41.06 |
| 8,443,921 B2 * | 5/2013 | Charnesky | ................ | F01P 7/10 180/68.1 |
| 8,469,128 B2 * | 6/2013 | Van Buren | ........... | B60K 11/085 165/44 |
| 8,473,164 B2 * | 6/2013 | Charnesky | ................ | B60K 11/085 123/41.04 |
| 8,485,296 B2 * | 7/2013 | Charnesky | ........... | B60K 11/085 165/98 |
| 8,505,660 B2 * | 8/2013 | Fenchak | .............. | B60K 11/085 180/68.1 |
| 8,517,130 B2 * | 8/2013 | Sakai | ................... | B60K 11/085 180/68.1 |
| 8,561,738 B2 * | 10/2013 | Charnesky | ........... | B60K 11/085 180/68.1 |
| 8,708,078 B2 * | 4/2014 | Charnesky | ........... | B60K 11/085 180/68.4 |
| 8,739,744 B2 * | 6/2014 | Charnesky | ........... | B60K 11/085 123/41.04 |
| 8,794,363 B2 * | 8/2014 | Wolf | .................... | B60K 11/085 180/68.1 |
| 8,915,320 B2 * | 12/2014 | Chinta | ................. | B60K 11/085 180/68.1 |
| 8,919,470 B2 * | 12/2014 | Hori | .................... | B60K 11/085 180/68.1 |
| 8,936,121 B2 * | 1/2015 | Vacca | .................... | B60K 11/04 165/44 |
| 8,967,308 B2 * | 3/2015 | Saito | .................... | B60K 11/085 180/68.1 |
| 8,983,735 B2 * | 3/2015 | Konishi | ............... | B60K 11/085 123/41.04 |
| 9,409,474 B2 * | 8/2016 | Macfarlane | ............... | F01P 7/12 |
| 9,599,050 B2 * | 3/2017 | Sugimoto | ................ | F01P 11/14 |
| 9,670,824 B2 * | 6/2017 | Sowards | ..................... | F01P 7/10 |
| 9,809,108 B2 * | 11/2017 | Ribaldone | ............ | B60K 11/085 |
| 9,810,138 B2 * | 11/2017 | Solazzo | ................... | F01P 11/14 |
| 9,827,847 B1 * | 11/2017 | Hanna | .................. | B60K 11/085 |
| 9,840,144 B2 * | 12/2017 | Aizawa | ................ | B60K 11/085 |
| 9,855,981 B1 * | 1/2018 | Dunford | ................ | B62D 35/00 |
| 9,878,609 B2 * | 1/2018 | Dudar | .................. | B60K 11/085 |
| 9,914,351 B2 * | 3/2018 | Kim | ..................... | B60K 11/085 |
| 9,950,612 B2 * | 4/2018 | Miller | .................. | B60K 11/085 |
| 9,975,421 B2 * | 5/2018 | Froling | ................. | B60K 11/04 |
| 2006/0060401 A1 * | 3/2006 | Bole | .................... | B60K 11/085 180/68.1 |
| 2010/0243352 A1 * | 9/2010 | Watanabe | ............ | B60K 11/085 180/68.1 |
| 2015/0217633 A1 | 8/2015 | Huijzers et al. | | |

OTHER PUBLICATIONS

Espacenet Bibliographic data:DE102013213136 (A1), Published Jan. 8, 2015, 1pg.
Espacenet Bibliographic data:DE602004007338 (T2), Published Mar. 6, 2008, 1pg.
Espacenet Bibliographic data:WO2017021205 (A2), Published Feb. 9, 2017, 1pg.

* cited by examiner

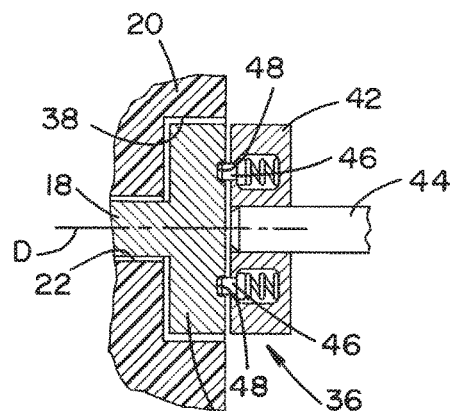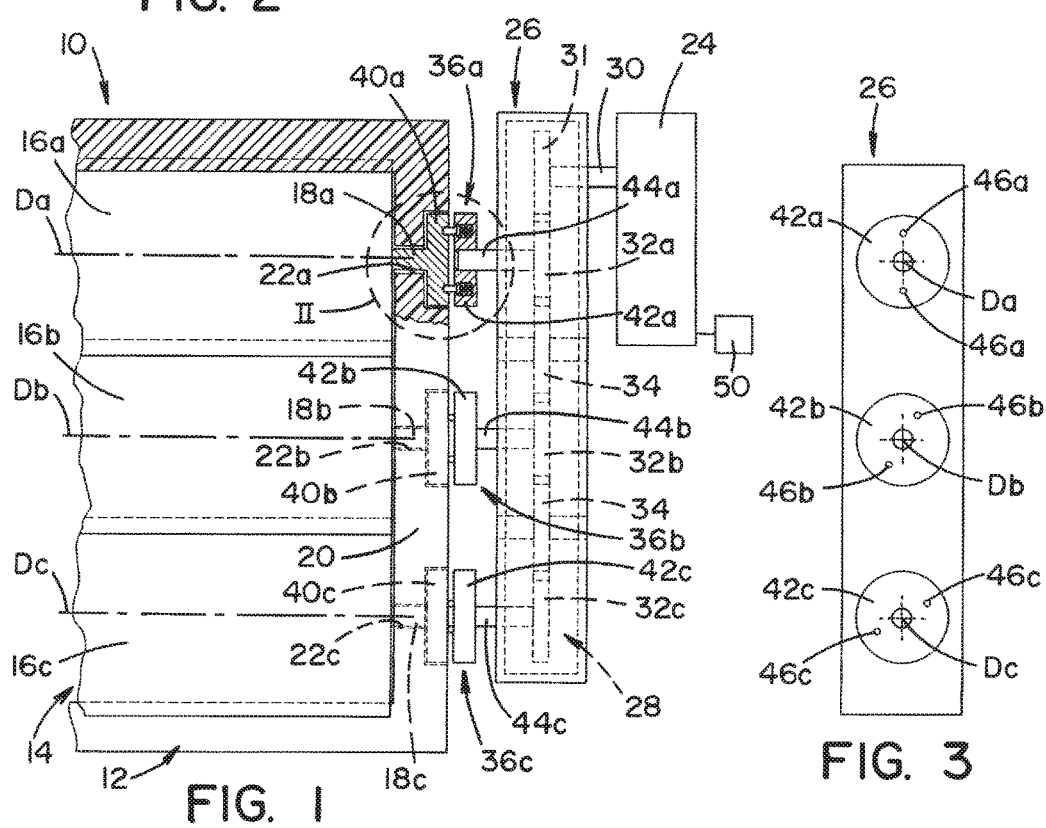

AIR FLAP DEVICE HAVING A PLURALITY OF AIR FLAPS WITH AIR FLAP MOVEMENT ENDING SEQUENTIALLY

The present patent application relates to an air flap device, i.e., choke, for a motor vehicle, comprising an air flap member with a flow-through opening and with a plurality of air flaps, which protrude into or pass through the flow-through opening and are mounted on the air flap member, so that they are each movable between a blocking position as a working position and a forward position as another working position, wherein each air flap in its blocking position prevents flow through the flow-through opening to a greater extent than in the forward position, wherein the air flap device has a closed position as an operating position, in which each air flap of the plurality of air flaps is in the blocking position as the working position associated with the closed position and has an open position as another operating position, in which each air flap of the plurality of air flaps is in the forward position as the working position associated with the open position, wherein the air flap device additionally has a drive device for providing a driving force for the movement of the air flaps between the blocking position and the forward position and a coupling device for transferring the driving force provided by the drive device to the air flaps.

BACKGROUND OF THE INVENTION

Such air flap devices are known in the field of the radiator grill on motor vehicles in general. The air flaps that are mounted movably on the air flap member serve to vary the flow through the flow opening as a function of its position to thereby vary by quantity the air flow flowing through the flow-through opening in driving operation of the motor vehicle. A convective cooling air flow through the flow-through opening can therefore be adapted to the cooling demand of function modules of the motor vehicle situated behind the flow-through opening in the direction of flow-through. For example, the warm-up phase of the internal combustion engine of a motor vehicle can be shortened in this way until reaching the rated operating temperature after a cold start or after a previous operating phase at a lower temperature than the rated operating temperature of the internal combustion engine. Reaching the rated operating temperature of the internal combustion engine can be monitored on the basis of the temperature of the coolant of the internal combustion engine to ascertain approximately whether the coolant temperature is above or below a predetermined threshold temperature.

By shortening the warm-up phase of the internal combustion engine, the period of time during which the internal combustion engine is operated with transient, and therefore suboptimal operating parameters can be shortened. During the warm-up phase the internal combustion engine usually emits a larger amount of pollutants in comparison with its operation at the rated operating temperature—per unit of time and/or per distance traveled.

Since the air flap device thus influences the pollutant emissions of a motor vehicle, it is desirable to be able to monitor its operational readiness and/or proper functioning.

SUMMARY OF THE INVENTION

An object of the present invention is therefore to improve upon the air flap device defined in the introduction to the extent that it can be tested easily and reliably with regard to its proper functioning.

This object and others is achieved according to the invention by a generic air flap device, to which the coupling device is coupled with the plurality of air flaps in such a way that at least a portion of the air flaps, because of an adjustment operation of the air flap device into a target operating position, reach the target working position associated with the target operating position at different points in time.

Due to the fact that at least some of the air flaps reach their target working position at different points in time, each individual event, in which one or more air flaps of the plurality of air flaps reach their target working position, can be detected with simple means.

The target working position here is preferably an end position of the air flaps beyond which the air flaps cannot be moved. If an electric drive device, such as an electric motor, is used as the drive for moving the air flaps, then the amount of electric current flowing through the drive device during an adjustment operation is an indication of whether or not an air flap has reached its target working position as the end position. Then when an air flap has reached its end position, i.e., it can no longer be moved further in the direction of movement in which it is being driven, then the current, as the so-called "standstill current" flowing through the drive device, shows an increase by amount in comparison with the previous phase of movement. When air flaps reach their target working position at different points in time, the change in current flowing through the drive device, resulting from each time the target working position is reached, can be detected, so that each individual time a target working position is reached, it can be detected separately by one or more air flaps.

However, the target working position need not be an end position of the air flaps. It is sufficient if the air flaps can be moved further in the previous direction of movement when in the target position but resistance to their movement is greater than that outside of the target working position. This also makes it possible already to detect the fact that the target working position has been reached.

In contrast with that, all the air flaps of a plurality of air flaps in the case of the state of the art air flap devices will usually reach their target working position at the same time, so that, without use of complex sensor systems, it is impossible to determine from this whether the target working position has been reached by only a few air flaps or all the air flaps.

In contrast with that, in the air flap device according to the invention, reaching the target working position by at least some of the air flaps can be ascertained by the electric current drawn by the drive device without requiring the use of complex sensor systems because at least some of the air flaps reach their target working position at different points in time due to the adjustment operation.

Reaching the target working position can be triggered by each individual air flap by designing the coupling device, so that each air flap of the plurality of air flaps reaches its respective target working position at a different point in time than the other air flaps when the air flap device is adjusted into a target operating position.

The target working position is preferably the same target working position as that already known in the state of the art for all air flaps from the plurality of air flaps, so that substantially uniform flow conditions can be achieved through all through-openings. Thus, after reaching the target operating position of the air flap device, i.e., when all the air flaps involved therein have reached their respective target working positions associated with the target operating position, then the flow gap formed between two pairs of neighboring air flaps is substantially of the same size for all the pairs of air flaps involved. This includes a gap with a gap dimension of "0," i.e., a closed flow-through opening.

It is fundamentally possible to design the coupling device so that, after reaching the target working position, a drive train leading to an air flap is deformed in at least some sections by the respective air flap with further exertion of the working force by the drive device, so that when an air flap reaches a target working position, it does not interfere with the drive for another air flap to reach the target working position. This deformation is preferably elastic.

However, this approach requires a very efficient drive device because when there are n air flaps provided with the greatest possible resolution of the air flap movement, n−1 drive trains must be deformed cumulatively in order for the last air flap to be able to reach its target working position.

The same goal can be achieved with a less powerful drive device when the air flap device is designed to separate a connection that transmits a driving force between the drive device and an air flap after said air flap has reached its target working position.

In doing so, a connection that transmits a driving force should already be regarded as separated in the sense of the present patent application if, due to a change in the connection in the support of an air flap on the air flap member, frictional forces that are larger by amount are exerted on the air flap than in the drive train between the drive device and the air flap. Although the drive device can then perhaps exert a residual driving force on the air flap by way of friction, this is not, however, great enough in amount to move the air flap in relation to the air flap member.

The term "driving force" includes the term "driving torque" and relates to a longitudinal driving force acting longitudinally with the direction of action of the force in a classical sense as well as a driving torque acting rotationally around an instantaneous axis.

In an advantageous refinement of the invention, to make the reaching of the target working position by a single air flap more readily comprehensible, the air flap device may be designed to separate a connection transmitting a driving force between the drive device and the air flap before another air flap has reached its target working position. Then, when one air flap has reached its target working position as the end position in comparison with the movement phase of the air flap immediately prior to that, a so-called standstill current can be detected on the drive device, this standstill current being of a higher amount than the driving current required during the movement drive of the moving air flap. If the connection transmitting the driving force between the drive device and the air flap is separated at the target working position before the next air flap of the plurality of air flaps has reached its target working position, then the detectable current value is reduced in amount until the next time a target working position is reached by the other air flap. Thus, for the next time a target working position is reached, a standstill current of the drive device can also be detected by another air flap, this standstill current being of the same order of magnitude by amount as the standstill current for the air flap, reaching its target working position previously.

With n air flaps, which reach their target working position one after the other and whose driving force-transmitting connection to the drive device is separated in each case before the next air flap has reached its target working position, the occurrence of n current peaks or at least increases in current levels can be detected on the basis of the standstill current, which occurs only briefly, as a reliable indication that all n air flaps have reached their target working position.

The detection signal of the drive current of the drive device or in general the detection signal of a detected variable, which is unambiguously associated with the driving force output by the drive device, it is possible to transmit to a control device such as the control device of a vehicle having the air flap device, which processes the signal, for example, by means of counting operations and/or comparison operations, and it is possible to conclude from the processing result the existence of a functional or nonfunctional status or a specific defect in an air flap that can be determined from the detection signal.

Although the air flaps can reach their target working positions one after the other in groups, it is preferable for the reasons given above if the coupling device is coupled to the plurality of air flaps in such a way that the air flaps of the plurality of air flaps reach their target working position, which is associated with the target operating position individually and one after the other.

The separation of the connection that transmits the driving force between the drive device and one or more of the plurality of air flaps may be implemented in the construction due to the fact that the coupling device is or can be coupled to the part of the air flaps, preferably all of the air flaps from the plurality of air flaps, each by way of a coupling that can be disengaged as a function of force and/or torque for transmitting the driving force.

The couplings that can be disengaged as a function of the force and/or torque may be complex couplings, in which the coupling parts can be switched between a connection position, in which a driving force is transmitted, and a disengaged position, which interrupts the transmission of driving force, and this switching can be accomplished by an electromagnet. However, an approach that is less complex technically is preferred. In order to achieve the simplest possible design of the inventive approach, it is thus advantageous if the individual couplings each have one coupling part on the drive end and one on the output end, which can be coupled to one another by means of a locking engagement that can be overcome. The locking engagement may be implemented, for example, by the fact that one coupling part of a coupling has at least one catch recess and the other coupling part of the same coupling has a catch protrusion, which is prestressed into a locking engagement position protruding toward the first coupling part, for example, by a prestressing device such as a spring, in particular a helical spring, a plate spring or the like. The catch protrusion on the one coupling part may engage in the catch recess in the other coupling part in a form-fitting manner in a predetermined relative position and may form a locking engagement therewith. In this locking engagement condition, the two coupling parts of the coupling transfer the driving force up to a predetermined limit driving force, which is a limiting torque in most cases. In the coupling, if the limit driving force is exceeded then it is no longer transmitted but instead a step is taken to ensure that the locking engagement that can be overcome between the coupling parts is released and the coupling parts of the coupling are moved relative to one another and/or the coupling part located closer to the air flap stops together with the air flap while the coupling part situated closer to the drive device is moved further in the sense of its previous drive when the driving force continues to be exerted. A group of coupling parts on the drive end and on the output end are connected in such a way that they can only rotate jointly. These are preferably the coupling parts on the drive end connected to the coupling device permanently because then the coupling device can be used to connect the coupling parts on the drive end to one another for joint rotation.

The limit driving force can be adjusted through the form of the formations that can be brought into form-fitting locking engagement, i.e., the catch recess and catch protrusion and/or by the amount of the prestress. One need only ensure that the drive device is capable of outputting a greater driving force and/or a greater driving torque than the limit driving force. If one air flap then reaches its target working position, which is an end position, any further movement is necessarily blocked, so that the driving force exerted by the drive device increases because of the standstill current flowing through it until it exceeds the limit driving force and releases the locking engagement transmitting the driving force previously between the two coupling parts.

Basically, an air flap may be driven to any type of movement between its two working positions. This may be a translatory movement or a rotational movement or a combined movement of translatory and rotational movements. Each one of the plurality of air flaps is preferably movable only by rotation between its working positions because of the small amount of installation space required for this.

To be able to ensure that some or all of the air flaps will reach their target working position in at least one driving direction at different points in time, the individual couplings, as already described above, may each have a coupling part on the drive end and a coupling part on the output end, which can be brought into engagement that transmits a driving force and can be released from this engagement. In doing so, the coupling parts on the drive end and/or the coupling parts on the output end are arranged so that they are adjusted relative to one another in one direction of movement.

Following the above description, the air flap device may have a sensor, which detects a variable that is clearly related to the driving force output by the drive device. The drive device is preferably an electrical drive device, and the sensor is preferably a sensor for detecting the driving current flowing through the drive device. However, the possibility should not be ruled out that in the case of a pneumatic or hydraulic drive device, a pressure sensor of the pneumatic gas or of the hydraulic fluid is in a working space of the drive device provided between the cylinder and a piston surface.

The target operating position may be any of the two aforementioned operating positions consisting of the closed position and the open position. Accordingly, the target working position may be any of the two aforementioned working positions consisting of the blocking position and the forward position.

The air flap device presented here is therefore designed not only so that two or more air flaps of a plurality of air flaps will reach their respective target working position at different points in time when there is an adjustment of the air flap device into a target operating position, but instead the air flap device is preferably also designed so that, when the air flap device is driven, starting from an initial operating position, an initial working position is departed from at different points in time. This can be ensured with the structural means described above.

The fact that the initial working position of an initial operating position is left at different points in time can be utilized advantageously to overcome obstacles to movement of the air flap device. For example, it may happen during the winter that some or all air flaps of the plurality of air flaps of the air flap device are frozen shut. Then, due to the sequential drive of the air flaps, which is possible with the air flap device according to the invention, each individual air flap can be driven against the obstacle to movement. Therefore, almost the entire driving force and/or driving torque made available by the drive device can be concentrated at least briefly on a single air flap, whereas with traditional air flap devices, in which the air flaps can always be driven only for joint movement, the driving force of the drive device is always distributed among the plurality of air flaps that can be driven jointly and in synchronization.

Because of the preferred coupling between the drive device and the individual air flaps that can be separated as a function of the force and/or torque as proposed above, there need not be any fear of overloading the drive device or the drive train in an attempt to drive individual air flaps against an obstacle to movement, because in the case of an unsuccessful attempt at breaking an air flap free, the coupling provided between the drive device and the air flap is separated easily and smoothly from the drive device because of the driving force, which then exceeds the limit driving force.

Therefore, according to an advantageous refinement of the air flap device according to the invention, when individual air flaps, which are subject to an obstacle to movement, are to be broken free, it is provided that, in at least one operating position of the air flap device, a connection between the drive device and at least a portion of the plurality of air flaps transmitting a driving force is separated but can be established as the initial operating position, and the connection between at least one air flap of the portion of air flaps and the drive device, said connection transmitting the driving force, is established only after another air flap of the plurality of air flaps has left its initial working position, which is associated with the initial operating position in the direction of its working position associated with the other operating position, respectively.

The present invention also relates to a motor vehicle having an air flap device such as that described above and improved upon, having a sensor, which detects at least one variable, which is unambiguously associated with the driving force by the drive device. The motor vehicle also has a control device, to which the signal is connected in a manner capable of transmission of signals. The control device is designed for processing the detection signals supplied by the sensor. Because of the sensor signals, the control device can ascertain and display a proper functioning suitability of the air flap device or a defect thereof. When the air flaps are arranged in such a way that they reach their target working position of a target operating position of the air flap device individually and one after the other, the control device can also identify the air flap that is not functioning properly and can do so on the basis of the detected signal described above, going beyond the mere existence of a defect, and can output this information to a vehicle occupant via a display device.

These and other objects, aspects, features, refinements and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein:

FIG. 1 shows a roughly schematic partial view of an air flap device according to the invention in its closed position, FIG. 2 shows an enlargement of the circle II from FIG. 1 for a more detailed description of a torque-transmitting coupling provided between the coupling device and the air flaps, and FIG. 3 shows a top view of the coupling device with coupling parts on the drive end.

DESCRIPTION OF PREFERRED EMBODIMENTS

Referring now to the drawings wherein the showings are for the purpose of illustrating preferred and alternative embodiments of the invention only and not for the purpose of limiting the same, FIG. 1 shows an air flap device according to the invention, which is labeled in general as 10. It comprises an air flap member 12, which surrounds a through-flow opening 14 and which supports, for example, three air flaps 16a, 16b and 16c to be rotatable about a respective axis of rotation Da, Db and Dc, which is parallel to its respective longitudinal axes (and to the plane of the drawing in FIG. 1).

The air flaps 16a, 16b and 16c are designed to be substantially identical, which is why the same components and sections thereof, which are the same and/or have the same function, are labeled in the following discussion with uniform reference numerals but different lower case letters for all air flaps. If the reference numerals associated with the description of the air flaps are used without any lower case letters, then the description applies to all air flaps 16a, 16b and 16c.

The air flaps 16 are accommodated rotatably in a strut 20 of the air flap member 12 via a shaft section 18. The shaft sections 18 pass through through-openings 22 in the strut 20 of the air flap member 12 for this purpose, the latter being designed to be complementary to the shaft sections 18 in at least some sections in order to support the latter rotatably with the smallest possible axial and radial play.

The air flaps 16, each of which in FIG. 1 is shown in its blocking position as a working position, can be driven via a drive device 24 to move into at least one other working position.

To transfer torque from the drive device 24 to the air flaps 16, a coupling device 26 is provided, transferring the driving force output by the drive shaft 30 of the drive device 24, namely the driving torque in this case, uniformly to the air flaps 16 via a gear drive 28, for example. To be able to drive each of the air flaps 16 in the same direction, the gear drive 28 has intermediate gearwheels 34 between individual pinion gear drives 32, preferably having the same diameter as a gearwheel 31 sitting on the driveshaft 30 of the drive device 24. Then the pinion gear drives 32 of the gear drive 28 may all have the same diameter, which greatly facilitates the fabrication and assembly of the gear drive 28. Instead of the gear drive 28, a linkage may also be provided, or a combination of a gear drive and a linkage may be provided.

The coupling device 26 is connected to the air flaps 16 by way of the respective couplings 36 in such a way as to be able to transfer a torque.

For the sake of clarity, the coupling 36a associated with the air flap 16a is shown in enlarged form in FIG. 2. The couplings 36 are designed to be substantially identical structurally, so that the explanation given below for the coupling 36a with respect to FIG. 2 is relevant for all couplings 36 of the air flap device 10 shown in FIG. 1.

A coupling disk 40 on the output end, as a coupling part 40 on the output end, is arranged in a recess 38 provided for this purpose in the vertical strut 20 of the air flap member 12. The coupling disk 40 on the output end is designed in one piece with the respective shaft section 18, for example.

A coupling disk 42 on the drive end, which is coupled to a gear output shaft 44 in a rotationally fixed manner, is axially opposite the coupling disk 40 on the output end, based on the axis of rotation D with respect to the air flaps 16, said transmission output shaft being connected to the respective pinion gear drive 32 in a torque-transmitting manner at the longitudinal end remote from the coupling disk 42 on the drive end.

The coupling 36 is a coupling that transmits a driving force as a function of the driving force and/or torque and may therefore have spring-preloaded catch protrusions 46 on one of their coupling parts, namely here on the coupling part 42 on the drive end, these catch protrusions being prestressed in a direction protruding toward the respective other coupling part, namely here the coupling part 40 on the output end.

The respective other coupling part, namely here the coupling part 40 on the output end, has catch recesses 48, into which the catch protrusions 46 engage when the catch protrusions 46 are directly opposite the catch recesses 48 axially, based on the axis of rotation D of the air flaps 16.

Due to the structural design of the ends of the catch protrusions 46 engaging in the catch recesses 48, due to the structural design of the catch recesses 48 and/or due to corresponding adjustment of the spring prestress through selection of suitable springs, the coupling 36 may be designed so that it separates the torque-transmitting connection between the coupling device 26 and the air flaps 16 when a predetermined limiting torque is exceeded and/or when a predetermined limit driving force is exceeded. The catch protrusions 46 then become disengaged from the catch recesses 48 and are in contact with the end side of the coupling part 40 on the output end. It should be noted here that the frictional force that can be transmitted between the catch protrusion 46 and the end side of the coupling part 40 on the output end that is not recessed is lower than that between the shaft sections 18 and the openings 22 and/or between the coupling disk 40 on the output end and the recess 38 accommodating it in the strut 20. In this case due to the friction-locking effect between the catch protrusion 46 and the section of the end side of the coupling disk 40 on the output end that is not recessed an adequate torque cannot be transmitted from the coupling device 26 to the respective air flap 16, so that it remains in its position until the catch protrusions 46 again enter into catch engagement with the respective catch recesses 48 because of the relative movement between the two coupling parts 40 and 42, and the respective air flap 16 is driven in a direction of movement, in which it can actually be driven.

Starting from the blocking position shown in FIG. 1 as the working position of the air flaps 16 associated with the closed position of the entire air flap device 10, the individual air flaps 16 can be moved only toward their feed-through position, in which they permit a preferably maximal flow through the through-opening 14 in a direction orthogonal to the plane of the drawing in FIG. 1.

FIG. 3 shows a top view of the coupling device 26 along the axes of rotation D of the air flaps 16. The coupling device 26 is in a position reached when the air flap device 10 has reached its closed position, i.e., when the air flap 16a, as the last air flap, has reached its blocking position associated with the closed position of the air flap device 10 as the target working position.

Accordingly, only the coupling disk 42a on the drive end at the top in FIG. 3 is in catch engagement with the respective coupling disk 40a on the output end associated with it on the opposite end. The two coupling disks 42b and 42c on the drive end beneath that are out of locking engagement with their respective coupling disks 40b and 40c on the output end and are at different distances away from a locking engagement position.

The coupling disk 42c on the drive end is the greatest distance away from a locking engagement position with the respective coupling disk 40c on the output end. The coupling disks 40 on the output end are all in the same relative position, i.e., in the example shown here, with catch recesses 48 situated exactly one above the other, as illustrated with the catch protrusions 46a, which are in locking engagement on the coupling disk 42a on the drive end at the top.

The reason for this is as follows: when the air flap device 10 is adjusted into the closed position illustrated in FIG. 1, the bottom air flap 16c is the first to reach its blocking position as the target working position associated with the closed position. The blocking position is preferably an end position beyond which the air flaps 16 cannot be moved in a closing direction.

When the air flap 16c reaches its target working position, the current value flowing through the drive device 24, which is an electrical drive device in the present example, increases briefly because of the standstill current, which then occurs on the air flap 16a, which is secured in an end position. The current value over time is detected by a control device 50, which is connected to the drive device 24 for single transmission in such a way as to transmit signals. The drive device 24 is additionally operated in the closing direction, so that the limiting torque between the coupling disks 40c and 42c is exceeded, so that the catch protrusions 46c on the coupling disk 42c on the drive end are disengaged with their respective catch protrusions 40c. Then the two other air flaps 16a and 16b, also driven by their drive device 24 and by the catch engagement of their couplings 36a and 36b, which is still in effect, move further in the direction of the blocking position.

Next, the air flap 16b reaches its blocking position, whereupon the procedure described above for the air flap 16c is repeated. A standstill current occurs and is detected by the control device 50. By continuing the movement drive in the direction of the blocking position, the coupling 36b also becomes disengaged, so that the air flap 16a continues its movement in the direction of the target working position (blocking position) by itself. When this also reaches its blocking position, a standstill current occurs again and is detected by the control device 50. In this instance, however, the drive device 24 is shut down by the control device 50, which can ascertain by data memory access that the last air flap has reached its target working position. When there are n air flaps, which reach their target working positions individually and one after the other, it is possible to ascertain, by defining n elevated standstill current values occurring in succession, that the closed position has been reached properly and that it is possible in such a way to ascertain that each individual air flap 16 has reached its target working position. If this is not the case, then the control device can ascertain which air flap appears to be defective, for example, because the elevated current value to be expected has failed to occur, for example, due to a break in the shaft section 18.

During proper operation, the control device 50 can monitor, for this purpose, predetermined time windows, which depend on the rotational speed of the drive device 24, in which the occurrence of standstill currents is to be expected when proper operation is as intended. If standstill currents of individual air flaps occur outside of these time windows, this may mean there has been an unwanted jamming of the air flap due to external influences, for example, due to soiling or a rock hit. This may also result in an error message being displayed.

If the air flap device 10 of FIG. 1 is adjusted from its initial closed position into its open position by the drive device 24, only the top air flap 16a is initially moved out of its blocking position to its flow-through position because only its coupling 36a is already transmitting a torque via an established catch engagement.

Since the other coupling disks 42b and 42c on the drive end, however, are coupled to the coupling disk 42a for joint rotation, they also rotate in the sense of an adjustment into a through position and reach their catch engagement positions, again individually and one after the other, so that the movement of the individual air flaps 16a, 16b and 16c begins sequentially starting from their shared blocking position to their third position, which is also shared.

In this way, the entire driving torque of the drive device 24 can first be concentrated at a single air flap up to the limiting torque, which may be advantageous to overcome obstacles to movement, for example, such as icing and the like.

The catch protrusions 46 and/or the catch recesses 48 may be designed by structural embodiments, so that the limiting torque in the opening direction is larger than that in the closing direction in order to make it possible to overcome an obstacle to movement in the closing direction with a greater probability than a less critical obstacle to movement when the air flap device is in the open position.

Whereas the top air flap 16a in FIG. 1 was the last to reach its blocking position, it will be the first to reach its through position. Therefore, after reaching the through position, which is in turn preferably an end position, the coupling 36a becomes disengaged so that the air flap 16b and finally the air flap 16c reach their through position in succession, wherein again each time the through position is reached by one of the air flaps, the control device 50 detects an increase in the drive current value. Therefore, a proper function condition of the air flap device 10 can be ascertained in the transition to its closed position as well as in the transition to its open position without any complicated sensor system and can be forwarded to a higher level vehicle controller or the like. Alternatively or additionally, the control device 50 may be part of the higher-lever vehicle controller, for example, an on-board computer.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An air flap device for a motor vehicle, comprising an air flap member having a flow-through opening and having a plurality of air flaps, which protrude into or pass through the flow-through opening and are each mounted relative to the air flap member, so that they can move between a blocking position as a working position and a feed-through position as another working position, wherein each air flap in its blocking position interferes with flow through the flow-through opening as intended to a greater extent than in the feed-through position, wherein the air flap device has as one operating position, a closed position, in which each air flap of the plurality of air flaps is in the blocking position as the working position associated with the closed position, and has an open position as another operating position, in which said each air flap of the plurality of air flaps is in the feed-through position as the working position associated with the open position, wherein the air flap device additionally has one drive device, common to the plurality of air flaps, for supplying a driving force for the movement of the plurality of air flaps between the blocking position and the feed-through position and has a coupling device for a transfer of the driving force supplied by the drive device to the plurality of air flaps, the coupling device is coupled to the plurality of air flaps, such that at least some of the plurality of air flaps, because of an adjustment operation of the air flap device into a target operating position, reach their target working positions associated with the target operating position at different points in time, wherein the coupling device is coupled to the plurality of air flaps such that the air flaps of the plurality of air flaps reach their target working positions associated with the target operating position individually and one after the other, and wherein the coupling device is coupled to at least one of the plurality of air flaps by a coupling wherein the coupling can be separated as a function of the driving force, and being for the transfer of the driving force.

2. The air flap device according to claim 1, wherein the air flap device is designed to separate a driving force transmitting connection between the drive device and an air flap after the air flap has reached its target working position.

3. The air flap device according to claim 2, wherein the air flap device is designed to separate the driving force transmitting connection between the drive device and the air flap before an additional air flap has reached its target working position.

4. The air flap device according to claim 1, further including a sensor, which detects at least one variable, which is in an unambiguous relationship with an amount of the driving force by the drive device.

5. A motor vehicle having an air flap device according to claim 4 and having a control device, to which the sensor is connected in a manner suitable for transmission of signals.

6. An air flap device for a motor vehicle, comprising an air flap member having a flow-through opening and having a plurality of air flaps, which protrude into or pass through the flow-through opening and are each mounted relative to the air flap member, so that they can move between a blocking position as a working position and a flow-through position as another working position, wherein each air flap in its blocking positon interferes with flow through the flow-through opening as intended to a greater extent than in the feed-through position, wherein the air flap device has as one operating position, a closed position, in which each air flap of the plurality of air flaps is in the blocking position as the working position associated with the closed position, and has an open position as another operating position, in which said each air flap of the plurality of air flaps is in the feed-through position as the working position associated with the opening position, wherein the air flap device additionally has a drive device for supplying a driving force for the movement of the plurality of air flaps between the blocking position and the feed-through position and has a coupling device for a transfer of the driving force supplied by the drive device to the plurality of air flaps, the coupling device is coupled to the plurality of air flaps, such that at least some of the plurality of air flaps, because of an adjustment operation of the air flap device into a target operating position, reach their target working positions associated with the target operating position at different points in time, the coupling device includes a coupling coupled to each air flap of the plurality of air flaps, each of the couplings can be separated as a function of a driving force and said each of the couplings being for the transfer of the driving force to said each air flap.

7. The air flap device according to claim 6, wherein the couplings each have a first coupling part on a drive end of the coupling device and a second coupling part on an output end of said each air flap, which can be brought into engagement with one another in such a way for the transfer of the driving force to said each air flap and can be released from said engagement, wherein at least one of the first and second coupling parts are arranged so that they are adjustable relative to one another in one direction of movement.

8. The air flap device according to claim 6, wherein the couplings each have a first coupling part on a drive end of the coupling device and a second coupling part on an output end of said each air flap, which can be coupled to one another by a catch engagement that can be overcome.

9. An air flap device for a motor vehicle, comprising an air flap member having a flow-through opening and having a plurality of air flaps, which protrude into or pass through the flow-through opening and are each mounted relative to the air flap member, so that they can move between a blocking position as a working position and a feed-through position as another working position, wherein each air flap in its blocking position interferes with flow through the flow-through opening as intended to a greater extent than in the feed-through position, wherein the air flap device has as one operating position, a closed position, in which each air flap of the plurality of air flaps is in the blocking position as the working position associated with the closed position, and has an open position as another operating position, in which said each air flap of the plurality of air flaps is in the feed-through position as the working position associated with the open position, wherein the air flap device additionally has a drive device for supplying a driving force for the movement of the plurality of air flaps between the blocking position and the feed-through position and has a coupling device for a transfer of the driving forces supplied by the drive device to the plurality of air flaps, the coupling device is coupled to the plurality of air flaps, such that at least some of the plurality of air flaps, because of an adjustment operation of the air flap device into a target operating position, reach their target working positions associated with the target operating position at different points in time, at least one of the operating positions of the air flap device is an initial operating position, a torque-transferring connection between the drive device and at least a portion of the plurality of air flaps is disconnected but can be established and the torque-transferring connection between at least one air flap of the portion of air flaps and the drive device is established only after another air flap of the plurality of air flaps has exited from its starting working position, which is associated with the initial operating position, in the direction towards its working position associated with the other respective operating position.

* * * * *

UNITED STATES PATENT AND TRADEMARK OFFICE
CERTIFICATE OF CORRECTION

PATENT NO. : 10,160,310 B2  
APPLICATION NO. : 15/838298  
DATED : December 25, 2018  
INVENTOR(S) : Domenico Solazzo et al.

It is certified that error appears in the above-identified patent and that said Letters Patent is hereby corrected as shown below:

In the Claims

Column 11, Line 55, Claim 6, the word "flow-through" should be replaced with --feed-through--.

Column 11, Line 66, Claim 6, the word "opening" should be replaced with --open--.

Column 12, Line 49, Claim 9, the word "forces" should be replaced with --force--.

Signed and Sealed this  
Tenth Day of September, 2019

Andrei Iancu  
*Director of the United States Patent and Trademark Office*